(12) United States Patent
Sugimoto et al.

(10) Patent No.: US 6,505,971 B2
(45) Date of Patent: Jan. 14, 2003

(54) SINTERED OIL RETAINING BEARING AND FABRICATION METHOD THEREOF

(75) Inventors: Mamoru Sugimoto, Okayama (JP); Toru Okuda, Okayama (JP); Akihiro Ikenoue, Okayama (JP); Takeshi Tanaka, Kosai (JP)

(73) Assignees: Sumitomo Electric Industries, Ltd., Osaka (JP); ASMO Co., Ltd., Kosai (JP)

( * ) Notice: Subject to any disclaimer, the term of this patent is extended or adjusted under 35 U.S.C. 154(b) by 0 days.

(21) Appl. No.: 09/897,523

(22) Filed: Jul. 2, 2001

(65) Prior Publication Data

US 2002/0051590 A1 May 2, 2002

(30) Foreign Application Priority Data

Sep. 26, 2000 (JP) ........................................ 2000-292420

(51) Int. Cl.$^7$ ............................................... F16C 17/02
(52) U.S. Cl. ................... 384/279; 384/902; 29/898.054
(58) Field of Search ................................. 384/279, 902, 384/276, 397, 898.054

(56) References Cited

FOREIGN PATENT DOCUMENTS

| JP | 6-123312 | 5/1994 |
| JP | 6-123313 | 5/1994 |
| JP | 2000065063 | 3/2000 |

OTHER PUBLICATIONS

Teruhisa Watanabe et al.; "Effects of Compacting and Sintering Conditions on the Properties of Iron–Lead–Copper Sintered Alloys for Porous Bearings", Report No. 36, Separate Version, Waseda University Casting Laboratory, Mar. 14, 1982, p. 82.

Teruhisa Watanabe, "Motion Property of Sintered Oil Retaining Bearing", Apr. 1, 1997, p. 40.

*Primary Examiner*—Lenard A. Footland
(74) *Attorney, Agent, or Firm*—W. F. Fasse; W. G. Fasse

(57) ABSTRACT

A sintered oil retaining bearing has a bearing bore through which a rotary shaft is inserted formed at a bearing main unit made of a porous sintered alloy. The inner circumferential wall serving as the bearing bore includes a center inner circumferential wall located at the center region of the inner circumferential wall, and one end side inner circumferential wall and other end side inner circumferential wall, located at one end side and the other end side, respectively, of the center inner circumferential wall in the direction of the rotary shaft. The center inner circumferential wall has a blinded portion where the air permeability is not more than $0.3 \times 10^{-3}$ darcy, and air permeability lower than that of the one end side and other end side inner circumferential wall.

13 Claims, 13 Drawing Sheets

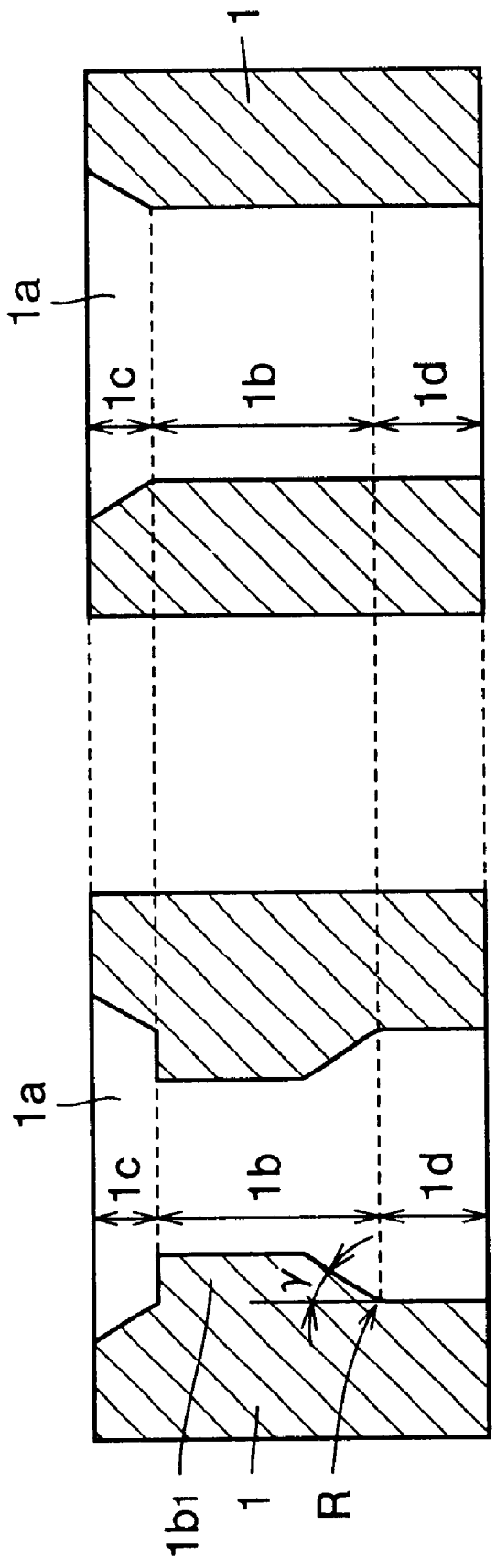

SINTERED OIL RETAINING BEARING AND FABRICATION METHOD THEREOF

BACKGROUND OF THE INVENTION

1. Field of the Invention

The present invention relates to a sintered oil retaining bearing and a fabrication method thereof. More particularly, the present invention relates to a sintered oil retaining bearing having a bearing bore formed at a bearing main unit made of a porous sintered alloy to insert a rotary shaft, and a method of fabricating such a sintered oil retaining bearing.

2. Description of the Background Art

A sintered oil retaining bearing formed of a porous sintered alloy and used infiltrated with a lubricant is widely employed as the bearing of a rotary shaft for various apparatuses since it can be used for a long period of time without having to supply oil.

In this type of sintered oil retaining bearing, a rotary shaft is inserted through the bearing bore of the bearing main unit formed of a porous sintered alloy. By the pumping action corresponding to rotation of the rotary shaft, the lubricant output from a plurality of small pores (open pore) infiltrated with oil in the bearing main unit and the exuding lubricant due to dilation caused by frictional heat form a lubricating film at the sliding surface of the bearing bore. The sliding surface between the rotary shaft and the bearing main unit is lubricated by this lubricating film.

In such a sintered oil retaining bearing, many open pores are formed to infiltrate the sliding surface of the bearing bore with lubricant. If the rotation stops at a very low temperature environment, the lubricant will be taken up into the open pores at the closing pore portion (open pore size decreased). This means that there will be no lubricant at the sliding surface between the rotary shaft and the bearing main unit when rotation starts, resulting in local contact between the rotary shaft and the bearing main unit to cause noise.

SUMMARY OF THE INVENTION

An object of the present invention is to provide a sintered oil retaining bearing that can have suction of the lubricant at the closing pore portion prevented and that can have sufficient lubricant supplied at the closing pore portion, and a fabrication method thereof.

According to a sintered oil retaining bearing of the present invention, a bearing bore through which a rotary shaft is to be inserted is formed in a bearing main unit made of a porous sintered alloy. The inner circumferential wall plane which becomes the bearing bore includes a closing pore portion where air permeability is not more than $0.3 \times 10^{-3}$ darcy.

Since the air permeability is as low as not more than $0.3 \times 10^{-3}$ darcy in the sintered oil retaining bearing of the present invention, suction of the lubricant into the open pore at the closing pore portion can be suppressed even if rotation is ceased under a very low temperature environment. Since there is sufficient lubricant at the sliding surface between the rotary shaft and the bearing main unit when rotation starts, the problem of local contact between the rotary shaft and the bearing main unit to cause noise can be prevented.

In the above sintered oil retaining bearing, the air permeability of the closing pore portion is preferably not more than $0.1 \times 10^{-3}$ darcy.

Accordingly, suction of lubricant into the open pore at the closing pore portion can be further suppressed.

In the above sintered oil retaining bearing, the inner circumferential wall that becomes the bearing bore preferably includes a center inner circumferential wall located at the center portion of the inner circumferential wall, one end side inner circumferential wall and other end side inner circumferential wall located at one end side and the other end side, respectively, of the center inner circumferential wall in the direction of the rotary shaft. The center inner circumferential wall corresponds to the closing pore portion, and has an air permeability smaller than that of the one end side inner circumferential wall and the other end side inner circumferential wall.

Accordingly, oil can be supplied sufficiently at the closing pore portion from the one end side or other end side of the inner circumferential wall that is porous.

In the above sintered oil retaining bearing, the effective porosity of the bearing main unit is at least 20% by volume.

Accordingly, oil can exude from the open pores at the sliding plane except for the region of the closing pore portion. By supplying the exuding oil to the closing pore portion, a secure lubricating film can be formed at the closing pore portion.

In the above sintered oil retaining bearing, the bearing main unit is preferably formed of at least one type of material selected from the group consisting of Fe, Fe—Cu system and Cu—Sn system.

By selecting such materials, an economical sintered oil retaining bearing of high hardness and favorable wear resistance can be provided.

In the above sintered oil retaining bearing, the bearing main unit preferably is formed of a material of the Fe—Cu system, and includes Fe reduced powder.

By this Fe reduced powder, air permeability not more than $0.1 \times 10^{-3}$ darcy can be achieved more easily than with atomized powder. Although the usage of atomized powder may be more preferable if simply the density is to be improved, the density at portions other than at the proximity of the surface will become too high from the standpoint of storing oil. The mold lifetime corresponding to the closing pore process will become shorter. In contrast, the usage of Fe reduced powder allows low density and high air permeability. Furthermore, closing pore can be performed more easily than with atomized powder, and the lifetime of the mold can be increased.

In the above sintered oil retaining bearing, the Fe reduced powder is preferably included at least 45% by mass and not more than 60% by mass of the entire mass.

If the amount of Fe reduced powder is less than 45%, the amount of Cu is so large that the material cost will become too high. If the amount of Fe reduced powder exceeds 60%, the bearing main unit will become so hard that the closing pore process will become difficult, and low air permeability cannot be achieved.

In the above sintered oil retaining bearing, the one end side inner circumferential wall has a first tapered portion where the hole diameter becomes larger as a function of approaching the one end side. The other end side inner circumferential wall has a first straight portion extending in the direction of the rotary shaft while maintaining the bore diameter of the bearing bore. The center inner circumferential wall includes a second straight portion extending in the direction of the rotary shaft while maintaining the diameter of the bearing bore at the other end side, and a second tapered portion at the one end side, having a larger bore diameter as a function of approaching the one end side, and an inclination angle smaller than that of the first tapered portion.

The tapered portion at the one end side of the bearing bore allows oil to be stored at the region between the tapered portion and the rotary shaft. The stored oil can be sequentially supplied to the sliding surface. This tapered portion can be formed using a mold that has a tapered portion at the time of compacting the powder. Since the mold can be formed in a tapered configuration, breakage of the mold at the time of compacting the powder can be prevented.

The tapered portion at the one end side inner circumferential wall and the straight portion of the other end side inner circumferential wall contribute to the storage and circulation of oil in ordinary operation. The tapered portion at the closing pore portion of the center inner circumferential wall contributes to storage of oil during ordinary operation, and the straight portion of the closing pore portion contributes to the storage of the lubricant at the sliding surface and circulation of oil until the operation starts in a very low temperature environment.

According to another aspect of the present invention, a fabrication method is provided of a sintered oil retaining bearing having a bearing bore formed to insert a rotary shaft in the bearing main unit made of a porous sintered alloy. The fabrication method includes the steps set forth in the following.

First, by powder compacting, a compact of the bearing main unit is formed so as to have an excessive portion in the bearing bore. A sintered compact is obtained by sintering the compact. By sizing the compact, the excessive portion is compressed by the mold, whereby a closing pore portion of air permeability lower than that of other portions is formed in the bearing bore.

By applying a compression process with the mold during the sizing process to form a closing pore portion according to the fabrication method of a sintered oil retaining bearing of the present invention, air permeability not more than $0.3 \times 10^{-3}$ darcy can now be achieved that was not possible by the conventional method.

In the above fabrication method of a sintered oil retaining bearing, the inner circumferential wall that becomes the bearing bore includes a center inner circumferential wall located at the center region of the inner circumferential wall, and one end side inner circumferential wall and other end side inner circumferential wall located at one end side and the other end side, respectively, of the center inner circumferential wall in the direction of the rotary shaft. The excessive portion is formed at the center inner circumferential wall.

Accordingly, sufficient oil can be supplied from either the one end side inner circumferential wall or the other end side inner circumferential wall that is porous.

In the above fabrication method of a sintered oil retaining bearing, the step of forming a compact preferably includes the step of forming an excessive portion so as to include a tapered portion that has a larger bore diameter of the bearing bore as a function of approaching the one end side inner circumferential wall or the other end side inner circumferential wall from the excessive portion, and an r portion (radius portion) having a curvature (curved portion), located between the tapered portion and the one end side or other end side inner circumferential wall.

By the tapered portion and radius portion, an abrupt stepped portion between the excessive portion and the one end side or other end side inner circumferential wall can be eliminated. Therefore, generation of a recessed portion caused by the stepped portion being pulled by the core rod during the sizing process can be prevented.

In the above fabrication method of a sintered oil retaining bearing, the dimension in diameter of the excessive portion in the diametral direction is at least 4% and not more than 10% the inner diameter of the bearing bore after the sizing process.

Accordingly, the desired air permeability can be achieved.

In the above fabrication method of a sintered oil retaining bearing, the dimension of the excessive portion in the diametral direction is at least 0.35 mm and not more than 0.9 mm in diameter.

Accordingly, the desired air permeability can be achieved.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 20A and 20B are schematic sectional views before and after the sizing process to describe that a recessed portion is not generated when the stepped portion between the excessive portion and the other end side inner circumferential wall is made gentle.

DESCRIPTION OF THE PREFERRED EMBODIMENTS

Embodiments of the present invention will be described hereinafter with reference to the drawings.

First Embodiment

Figure 1:
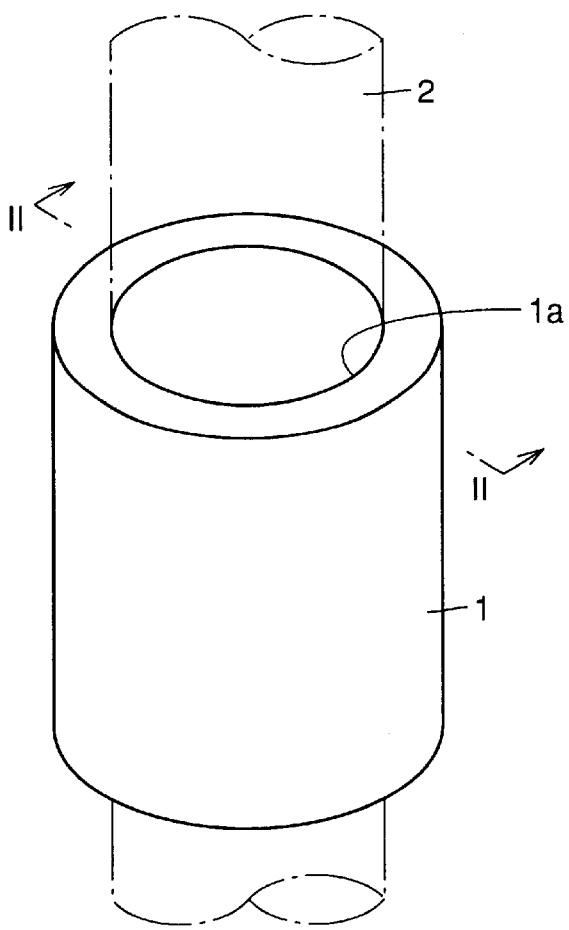
FIG. 1 is a perspective view schematically showing a structure of a sintered oil retaining bearing according to a first embodiment of the present invention.
Figure 2:
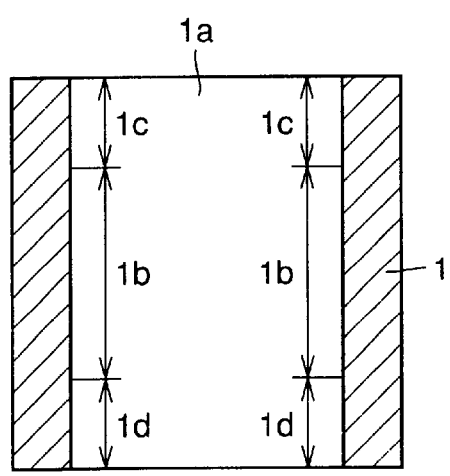
FIG. 2 is a schematic sectional view of the sintered oil retaining bearing of FIG. 1 taken along line II—II.

Referring mainly to FIGS. 1 and 2, a sintered oil retaining bearing according to a first embodiment of the present invention includes a bearing main unit 1 formed of a porous sintered alloy. A bearing bore 1a is formed in bearing main unit 1 through which a rotary shaft 2 is inserted. The inner circumferential wall of bearing bore 1a includes a center inner circumferential wall 1b and one end side inner circumferential wall 1c and the other end side inner circumferential wall 1d at the one end side and the other end side, respectively, of center inner circumferential wall 1b.

One end side inner circumferential wall 1c and other end side inner circumferential wall 1d have a porous surface. Center inner circumferential wall 1b is blinded to have air permeability lower than the air permeability of one end side inner circumferential wall 1c and other end side inner circumferential wall 1d. Center inner circumferential wall 1b has an air permeability not more than $0.3 \times 10^{-3}$ darcy, preferably not more than $0.1 \times 10^{-3}$ darcy. The closing pore portion is preferably provided at the entire circumference of center inner circumferential wall 1b. However, the closing pore portion may be provided only partially of center inner circumferential wall 1b.

The effective porosity of bearing main unit 1 at regions other than center inner circumferential wall 1b is at least 20% by volume. Bearing main unit 1 is preferably formed of at least one type of material selected from the group consisting of the systems Fe (iron), Fe—Cu (iron-copper) and Cu—Sn (copper-tin).

Figure 3:
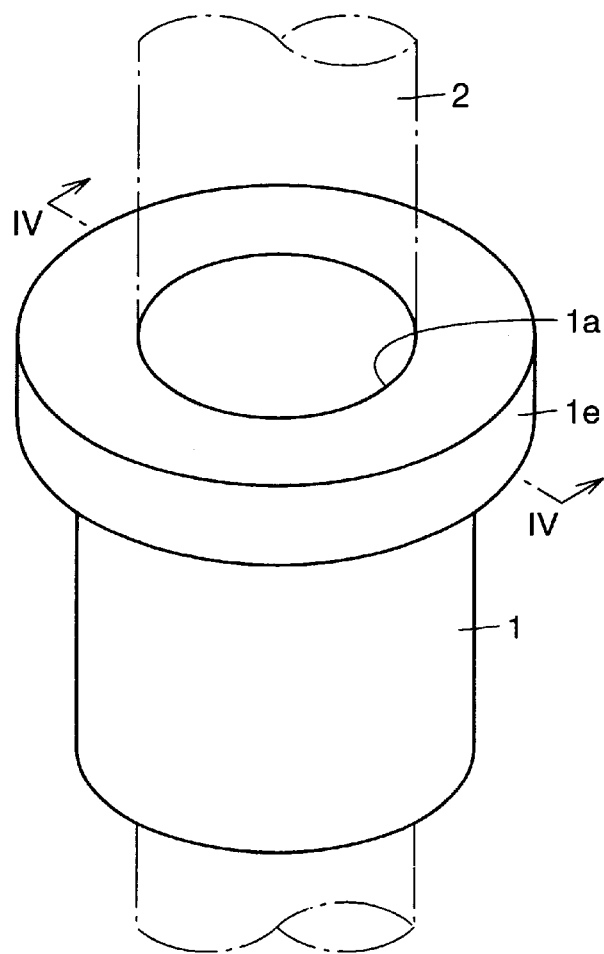
FIG. 3 is a perspective view showing another schematic structure of a sintered oil retaining bearing according to the first embodiment of the present invention.
Figure 4:
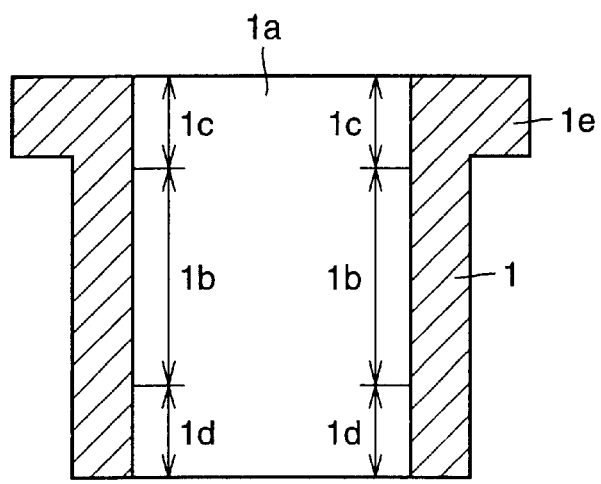
FIG. 4 is a schematic sectional view of the sintered oil retaining bearing of FIG. 3 taken along line IV—IV.
Figure 5:
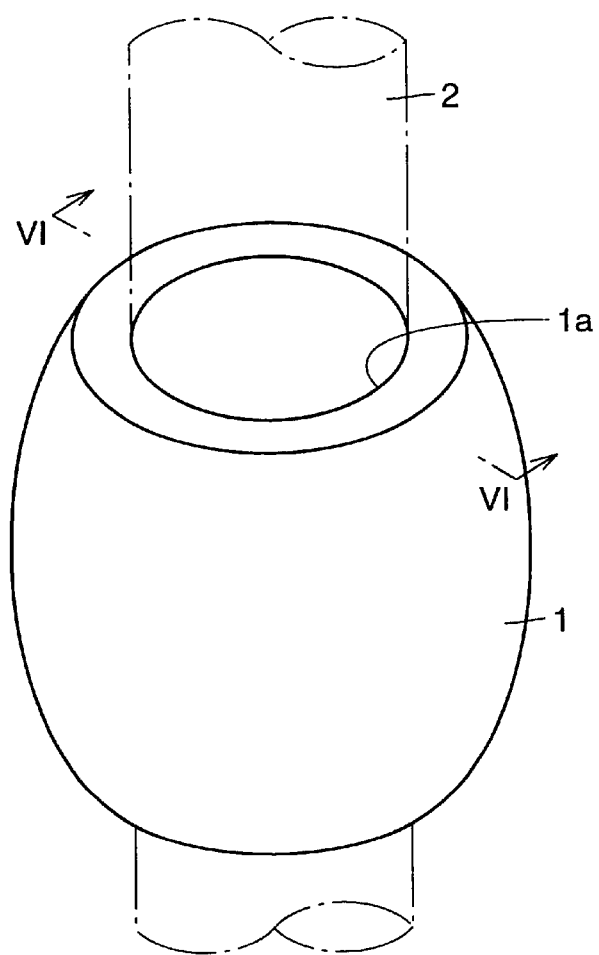
FIG. 5 is a perspective view showing a further schematic structure of a sintered oil retaining bearing according to the first embodiment of the present invention.
Figure 6:
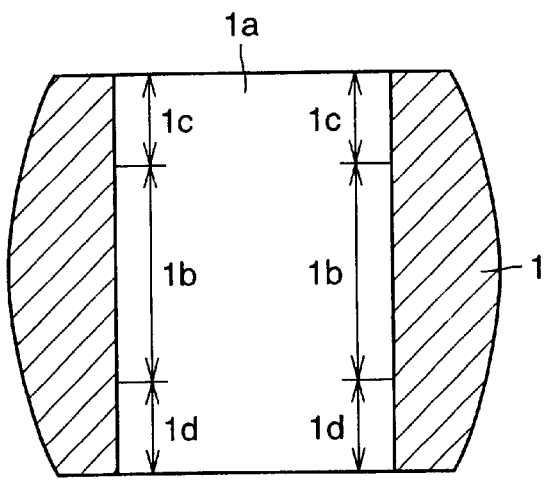
FIG. 6 is a schematic sectional view of the sintered oil retaining bearing of FIG. 5 taken along line VI—VI.

Although the above description corresponds to a straight bearing, the present invention is similarly applicable to a flanged bearing as shown in FIGS. 3 and 4 and to a sphere metal bearing as shown in FIGS. 5 and 6.

In other words, a structure in which the inner circumferential wall of bearing bore 1a includes a blinded center inner circumferential wall 1b and one end side inner circumferential wall 1c and the other end side inner circumferential wall 1d of a porous surface can also be applied to a flanged bearing that has a flange 1e provided at a straight bearing 1 as shown in FIGS. 3 and 4, and to a sphere metal bearing where the outer circumferential plane of the bearing has a curvature as shown in FIGS. 5 and 6.

A method of fabricating a straight bearing according to the present embodiment of FIGS. 1 and 2 will be described hereinafter.

Figure 7:
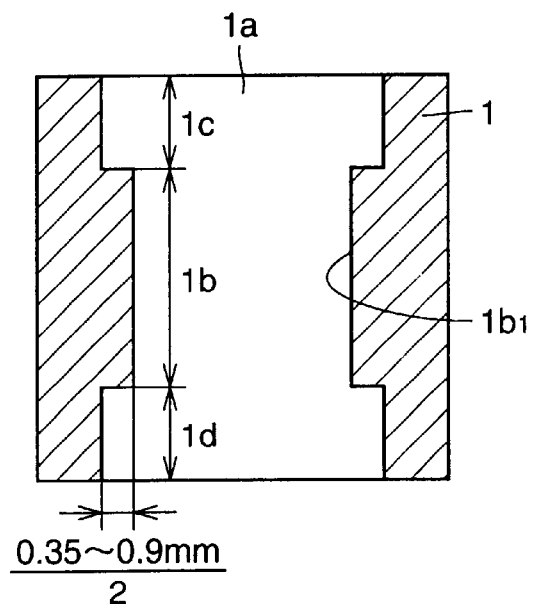
FIGS. 7 and 8 are schematic sectional views of the sintered oil retaining bearing of the first embodiment showing sequential steps of a fabrication method thereof.

Referring to FIG. 7, powder including at least one type of material selected from the group consisting of, for example, Fe, Fe—Cu system and Cu—Sn system is prepared as the raw material powder. The raw material powder is mixed and subjected to compression molding, whereby a compact 1 is formed having an excessive portion $1b_1$ at center inner circumferential wall 1b in bearing bore 1a. Then, compact 1 is sintered to result in a sintered compact 1.

Figure 8:
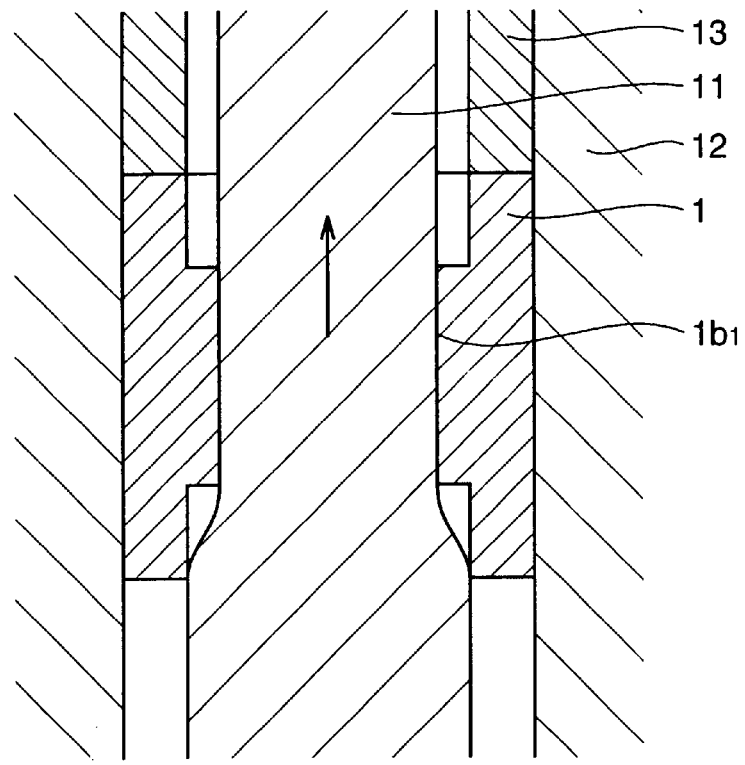

Referring to FIG. 8, sintered compact 1 is inserted into a die 12. A core rod 11 is inserted from below through sintered compact 1 with the upper side abutted against an upper punch 13. The diameter of core rod 11 increases partway in the direction of the shaft. This portion of core rod 11 having the larger diameter causes excessive portion $1b_1$ to be compressed outwards in the circumferential direction. Accordingly, excessive portion $1b_1$ is crushed outwards in the circumferential direction, whereby the inner circumferential wall of bearing bore 1a becomes substantially uniform in diameter in the direction of the rotary shaft, and a blinded center inner circumferential wall 1b is obtained.

Then, the oil impregnation process and inspection process are carried out to result in a completed product of a sintered oil retaining bearing.

The inventors of the present invention conducted experiments set forth below to confirm the effect of a lower air permeability by the closing pore process.

For a Fe—Cu system porous bearing (inner diameter φ8×maximum outer diameter φ17×length 11: sphere metal bearing), bearings having the air permeability of $0.09 \times 10^{-3}$, $0.4 \times 10^{-3}$, $10 \times 10^{-3}$ and $30 \times 10^{-3}$ darcy were prepared, all having the oil content of at least 20%. These bearings were cooled for one whole day at $-40°$ C. assuming upland and cold district environment. As a result, oil was still present at the surface of the inner diameter of the bearing with the air permeability of $0.09 \times 10^{-3}$ darcy whereas the lubricating film was not observed at the surface of the inner diameter of the bearings with the air permeability of $0.4 \times 10^{-3}$, $10 \times 10^{-3}$ and $30 \times 10^{-3}$ darcy. Bearing experiments were applied on each of the bearings of such states. Upon initiating the operation at low temperature ($-40°$ C.), generation of noise was not identified with the bearing having the air permeability of $0.09 \times 10^{-3}$ darcy whereas generation of noise was identified with bearings having the air permeability of $0.4 \times 10^{-3}$, $10 \times 10^{-3}$ and $30 \times 10^{-3}$ darcy.

It was therefore found that no noise is generated at the time of initiating the operation even at a temperature as low as $-40°$ C. corresponding to upland and cold district environment as long as the air permeability of the closing pore portion is not more than $0.3 \times 10^{-3}$ darcy. It was also found that noise generation can further be suppressed by setting the air permeability to not more than $0.1 \times 10^{-3}$ darcy.

In the foregoing, "air permeability" refers to the constant applied to filters, porous bearings and the like as to apparatuses that include the porous material as a function thereof. This air permeability is defined by ISO to be obtained as set forth below using the empirical formula by Darcy, and used together with the lubrication theory of the Stribeck diagram or the reciprocal of Sommerfeld. This air permeability is indispensable to identify the aptitude of lubrication.

Figure 9:
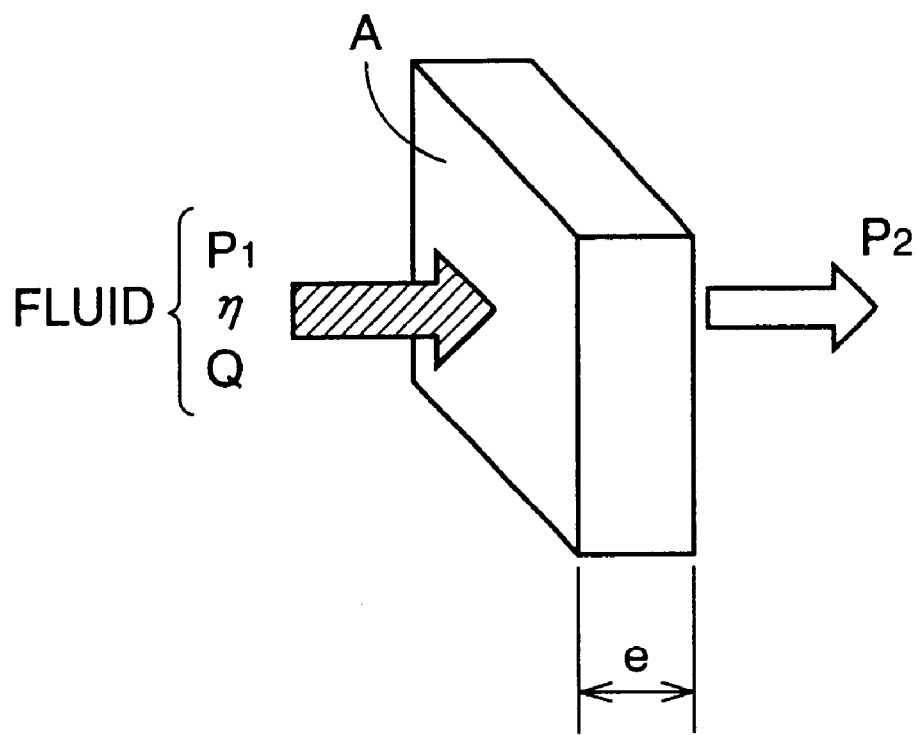
FIG. 9 is a perspective view to describe air permeability.

Referring to FIG. 9, when a fluid having the viscosity coefficient of η (N·s/m²) and pressure of $P_1$ (Pa) is passed through at the volume flow of Q(m³/s) from one side plane of a specimen having an area A(m²) and thickness e (m), the air permeability coefficient is obtained by the following equation (1) by representing the pressure loss ΔP (Pa) as $P_1 - P_2$ where the pressure after passage was $P_2$ (Pa).

$$\Psi_V = \frac{Q \cdot \eta \cdot e}{\Delta P \cdot A} \quad (1)$$

Here, 1 m²=$10^{12}$ darcy is used since the unit of m² is extremely small.

Since the subject of measurement, whether a filter or a bearing, often takes a cylindrical form, the method of measuring the air permeability was standardized with that of a simple shape. Conventionally, the measurement method of the mode shown in FIG. 10 was often used. More specifically, under the state where great pressure is applied on a cylindrical specimen via a thick rubber packing, the amount of air leaking outwards at the circumferential side when pressurized air of constant pressure is introduced towards the inner circumferential surface side of the cylindrical specimen was measured.

However, the measurement carried out here slightly differs. Under the state where small pressure is applied on a cylindrical specimen via a thin rubber packing as shown in FIG. 11, the amount of air passing from the outer circumferential side to the inner circumferential side when the inner circumferential region of the cylindrical specimen was decompressed at a constant pressure was measured.

Figure 10:
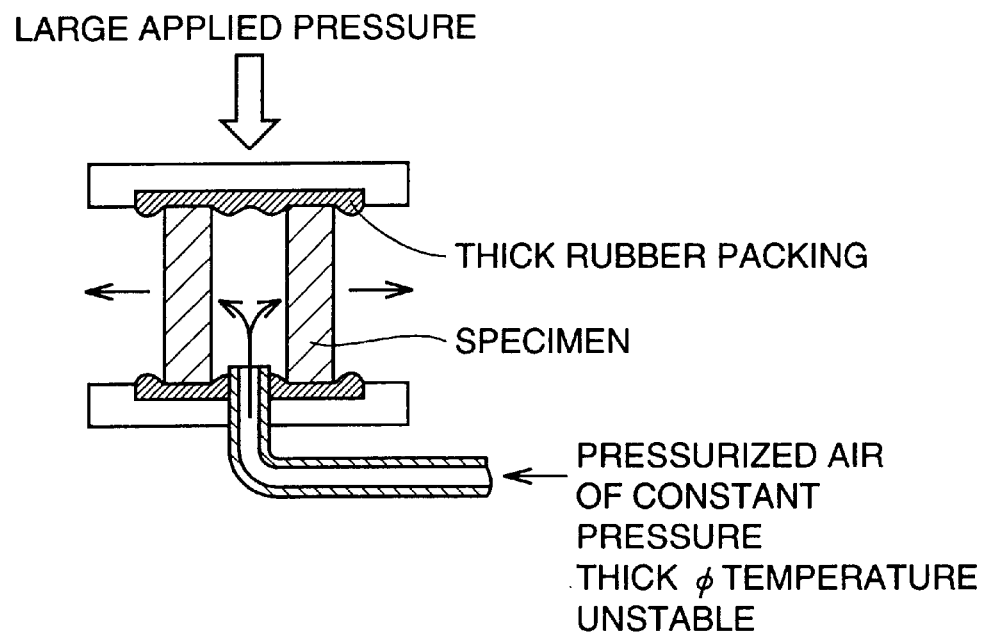
FIG. 10 is a schematic cross sectional view to describe a general method of measuring air permeability.
Figure 11:
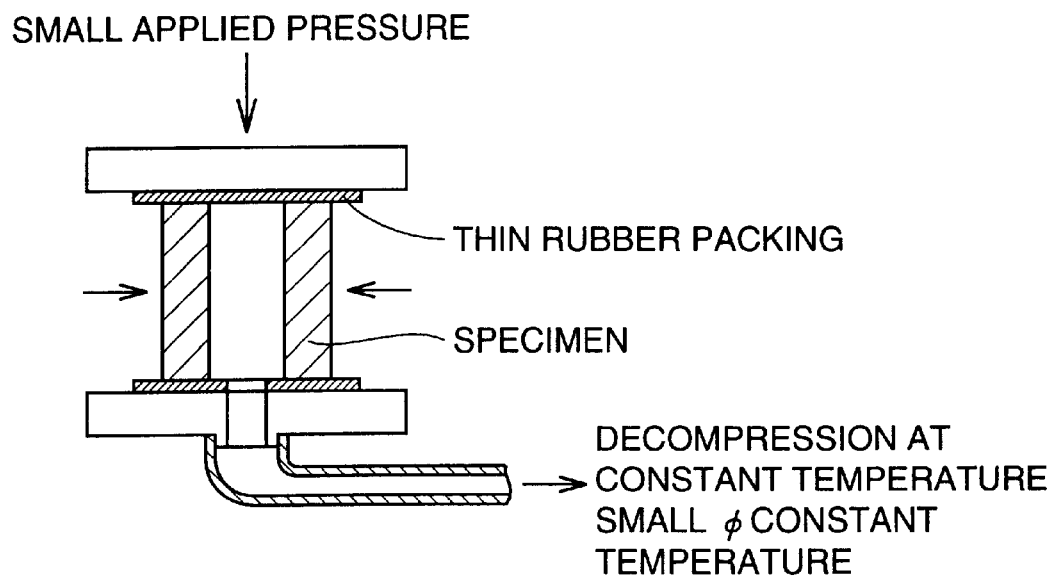
FIG. 11 is a schematic cross sectional view to describe the air permeability measurement method employed in the present invention.

In contrast to the apparatus of FIG. 10, the apparatus of FIG. 11 is configured so as to reduce the influence of the air temperature and the effect of the specimen attachment. The measurement apparatus of FIG. 11 was easily fabricated by modifying the commercially available Linerse method measurement apparatus.

It is to be noted that the above equation (1) is directed to a specimen of a flat shape. Since the specimen was cylindrical in shape in practice, the following equation is used.

$$\phi = \frac{\eta \cdot \log_e \frac{b}{a} \cdot Q}{2\pi \cdot L \cdot \Delta P} \quad (2)$$

In the above equation (2), a, b and L represent the outer diameter, inner diameter, and length, respectively. $\phi$ is equal to $\Psi_v$. The other characters are identical to those of equation (1). The dimension becomes $m^2$ by the following equation (3).

$$\frac{\frac{N \cdot s}{m^2} \cdot \frac{m}{m} \cdot \frac{m^3}{s}}{m \cdot \frac{N}{m^2}} = m^2 \quad (3)$$

Although generally 1 $m^2=10^{12}$ darcy, it is 1 $cm^2=10^8$ darcy here since the measurement is based on cm.

The values of $\eta$, a, b, Q, L and $\Delta P$ were recorded into the log table to correspond to equation (2). Calculation was effected to produce the results. The resultant record was calculated in the former c.g.s. unit.

Figure 12:
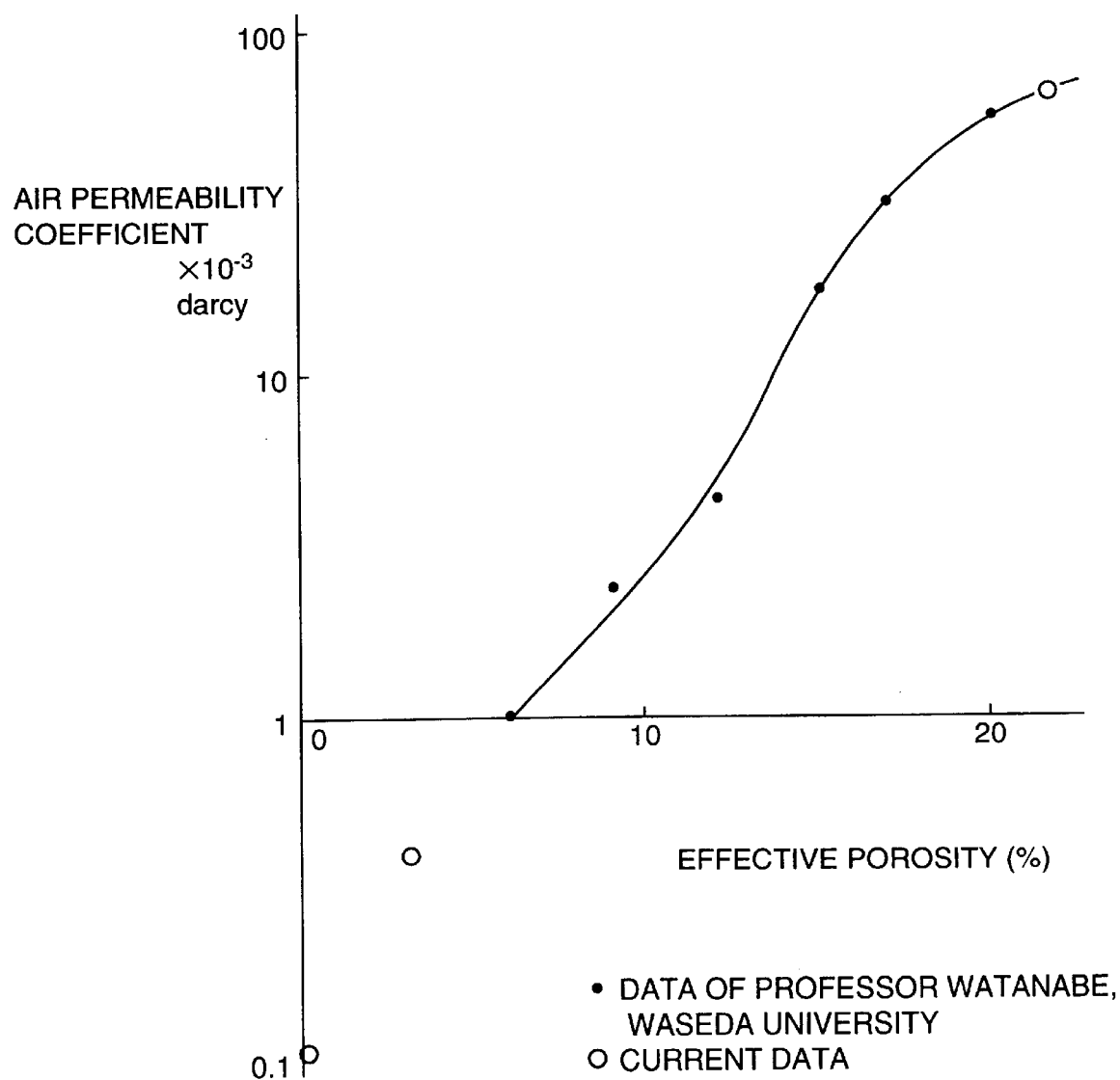
FIG. 12 is a diagram to show the relationship between the air permeability coefficient and effective porosity.

The data in "Motion Property of Sintered Oil Retaining Bearing" only exhibited those of at least 6% in effective porosity for general sintered components such as porous sintering as shown in FIG. 12. Therefore, the inventors of the present invention measured the air permeability coefficient for specimens having the effective porosity of 3% and 1% obtained according to the method of the present embodiment shown in FIGS. 7 and 8. As a result, it was confirmed that approximately $0.1 \times 10^{-3}$ darcy can be obtained for a specimen of 1% in effective porosity as shown in FIG. 12. In other words, it was confirmed that a sintered oil retaining bearing having a portion of not more than $0.1 \times 10^{-3}$ darcy in air permeability was obtained by means of the method of the present embodiment.

Thus, since the air permeability can be set to as low as not more than $0.3 \times 10^{-3}$ darcy in the present embodiment, the disadvantage of the lubricant being taken up into the open pore at the closing pore portion can be suppressed even if operation is ceased in a very low temperature environment. Accordingly, there is sufficient lubricant at the sliding surface between the rotary shaft and the bearing main unit. The problem of noise generation caused by local contact between the rotary shaft and the bearing main unit can be prevented.

Second Embodiment

The second embodiment relates to the material powder used in the fabrication of a sintered oil retaining bearing.

Figure 13:
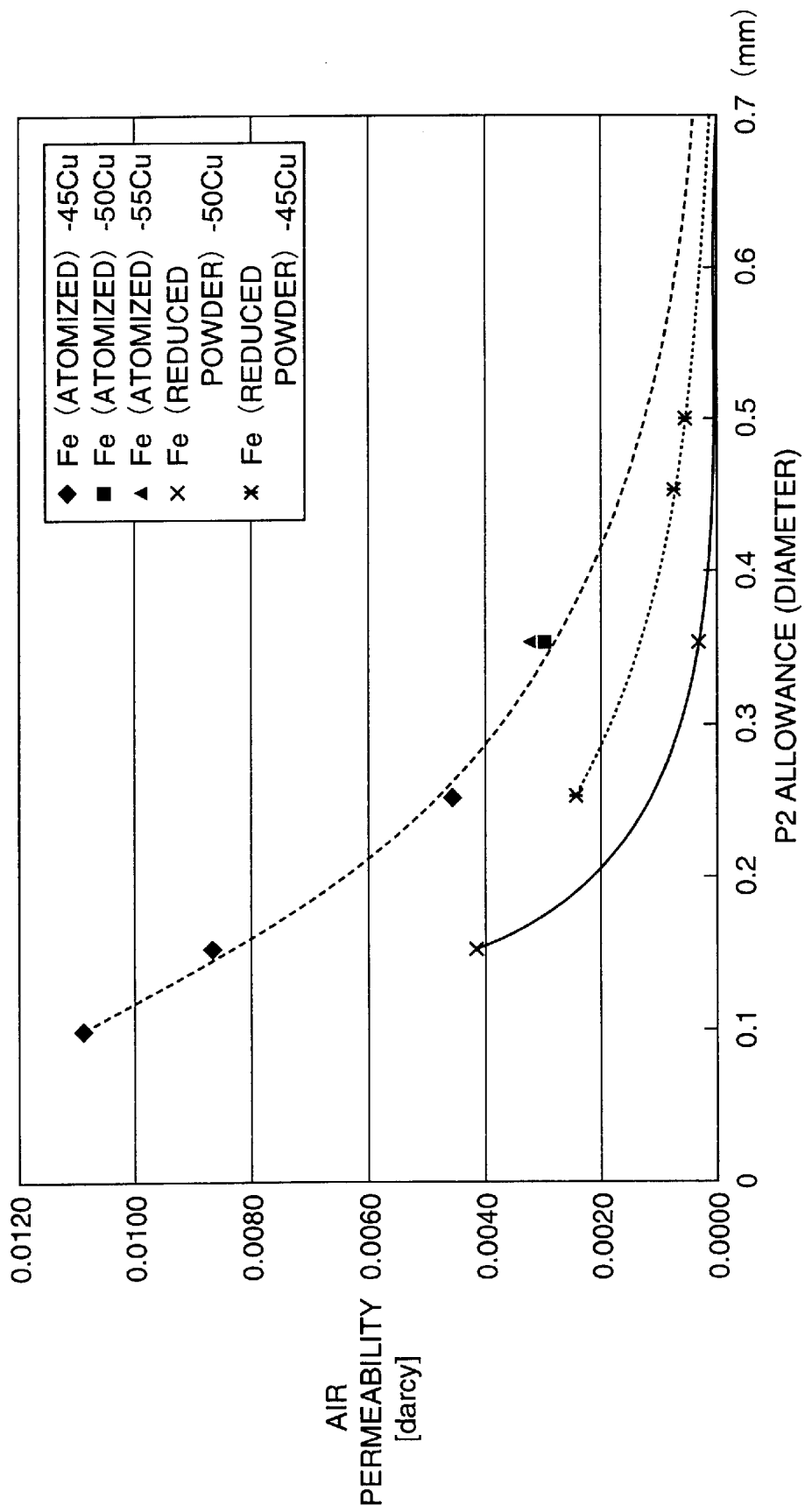
FIG. 13 is a diagram showing the relationship between air permeability and P2 allowance.

The inventors of the present invention carried out air permeability testing using a Fe—Cu system bearing ($\gamma=6.45$ g/cm$^3$) of inner diameter $\phi 8 \times$ outer diameter $\phi 17 \times$ length 11 without impregnation to obtain the data shown in FIG. 13. It is apparent from FIG. 13 that air permeability not more than $0.1 \times 10^{-3}$ darcy could be easily obtained by a bearing using Fe reduced powder than that using atomized powder.

The reduced powder of Fe is preferably at least 45% by volume and not more than 60% by volume of the total volume. If the Fe reduced powder is less than 45% by volume, the amount of Cu increases to result in a costly sintered oil retaining bearing. The advantage of reducing the cost of the bronze material of the Fe—Cu system will be degraded. If the amount of Fe reduced powder exceeds 60% by volume, the bearing main unit will become so hard that it will be difficult to effect the closing pore process. A sintered oil retaining bearing with a portion of low air permeability cannot be obtained.

The usage of Fe reduced powder is general for Fe system and Fe—Cu system sintered oil retaining bearings. The intention is to reduce the density of the sintered oil retaining bearing (increase the porosity) to increase the air permeability while being immune to fracture. Resistance to fracture is achieved even if the density is reduced by virtue of the superior compactness of the Fe reduced powder.

In order to reduce the air permeability, the density must be increased. Atomized powder is suitable for this purpose. However, the usage of atomized powder will result in a sintered oil retaining bearing in which the density is too high for portions other than the proximity of the surface from the standpoint of containing oil. Furthermore, the mold lifetime during the closing pore process will be degraded.

By using reduced powder superior in working in the present embodiment, the closing pore process can be effected more easily than the case where atomized powder is used. The air permeability can easily be reduced.

Figure 14:
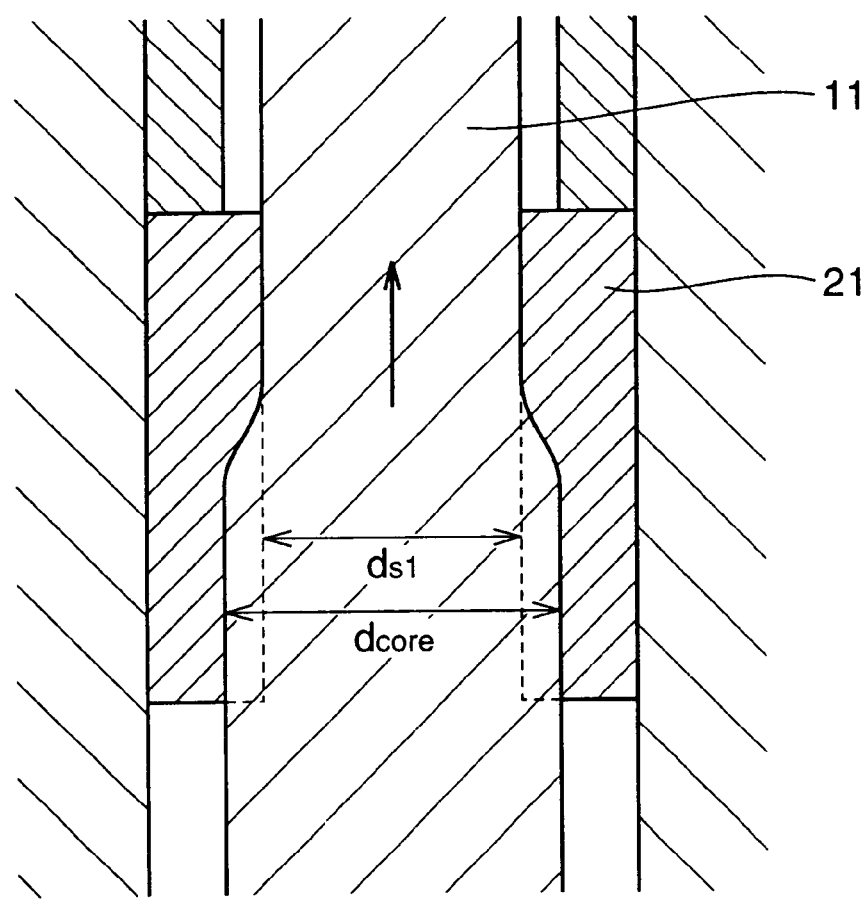
FIG. 14 is a diagram to describe P2 allowance.

The P2 allowance in FIG. 13 corresponds to the value of the inner diameter dimension $d_{S1}$ prior to the sizing process subtracted from the core dimension $d_{core}$ after the sizing process during the sizing process of a sintered compact 21 using core rod 11 as shown in FIG. 14. A larger value of this P2 allowance implies easier closing pore. The mold resistance is increased as the value of P2 allowance increases. Sticking and fracture will easily occur.

By calculating in advance the closing pore allowance (P2 allowance) from the required air permeability, an economical sintered oil retaining bearing of high quality can be fabricated with no waste such as the damage of the mold. Preferably, the dimension of excessive portion $1b_1$ in the diametral direction of FIG. 7 is 4–10% of the inner side nominal dimension of the completed product or 0.35–0.9 mm (in diameter). The provision of excessive portion $1b_1$ of such a dimension allows a closing pore portion that is sufficiently blinded and that has low air permeability to be obtained.

If the dimension of excessive portion $1b_1$ in the diametral direction is less than 4% the inner side nominal dimension of the completed product, increase of the density is insufficient so that open pores will remain at the surface layer. The lubricant at the surface will be taken into the bearing by the reduction of air volume in low temperature. If the dimension exceeds 10%, the increase of the density will become so great that the load is increased. The problem of mold damage or stick will easily occur.

Third Embodiment

The third embodiment relates to the structure of the tapered portion at the inner circumferential wall of the bearing bore.

Figure 15:
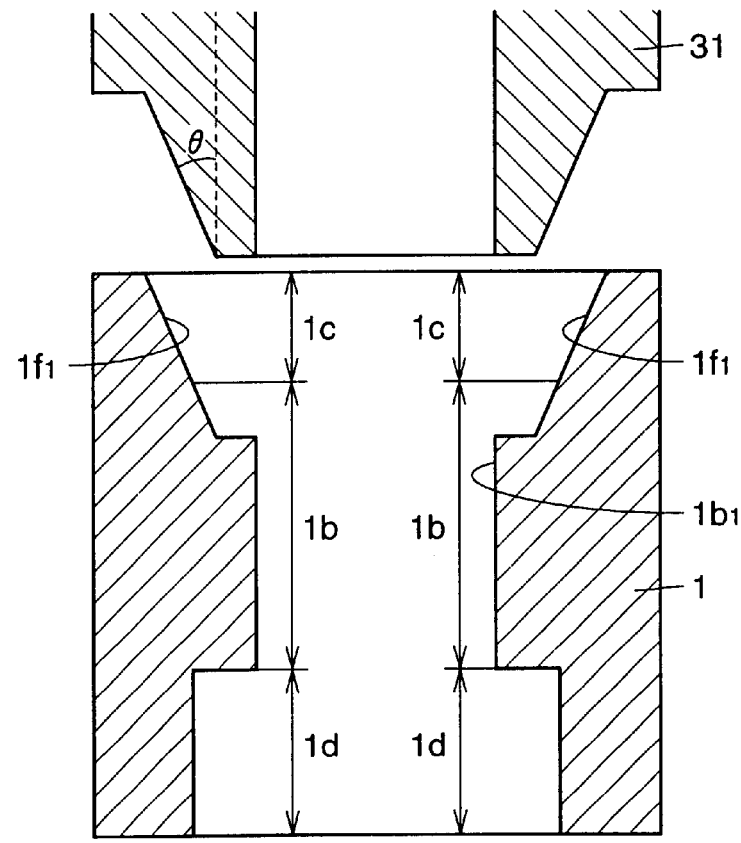
FIGS. 15 and 16 are schematic sectional views of a sintered oil retaining bearing according to a third embodiment of the present invention indicating sequential fabrication steps thereof.

Referring to FIG. 15, the compact of bearing main unit 1 is formed to include an excessive portion $1b_1$ at center inner circumferential wall $1b$, and a tapered portion $1f_1$ at one end side inner circumferential wall $1c$ and center inner circumferential wall $1b$. This tapered portion $1f_1$ is formed by selecting a tapered configuration (angle θ) for the end portion of upper punch 31 used in compacting.

Tapered portion $1f_1$ is formed to have a larger inner diameter towards one end (upper end in drawing) of compact 1. Tapered portion $1f_1$ may be provided at one or both of one end side inner circumferential plane $1c$ and other end side inner circumferential plane $1d$. Furthermore, tapered portion $1f_1$ does not have to be provided at center inner circumferential plane $1b$.

Following a sintering step under this state, a sizing process is applied.

Figure 16:
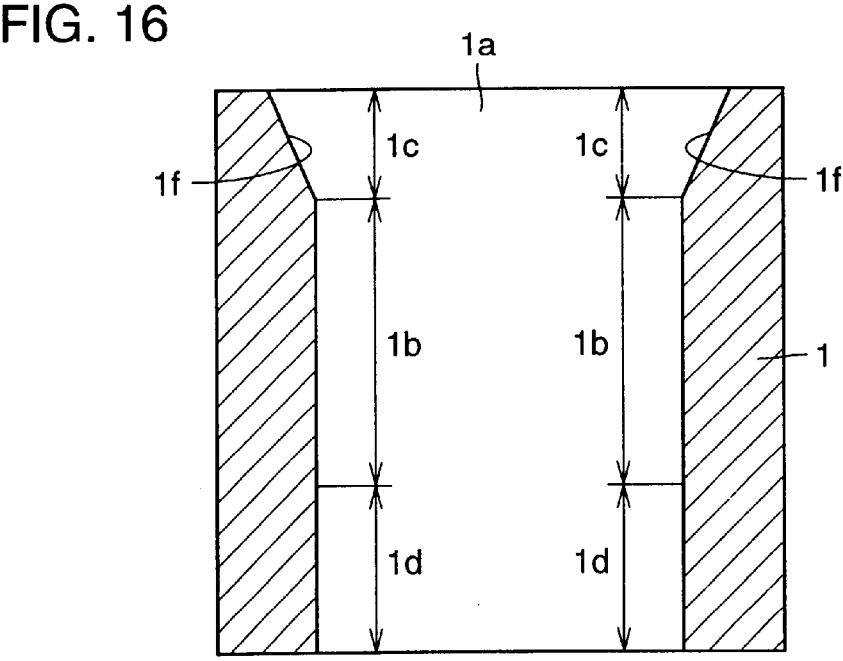
Figure 17:
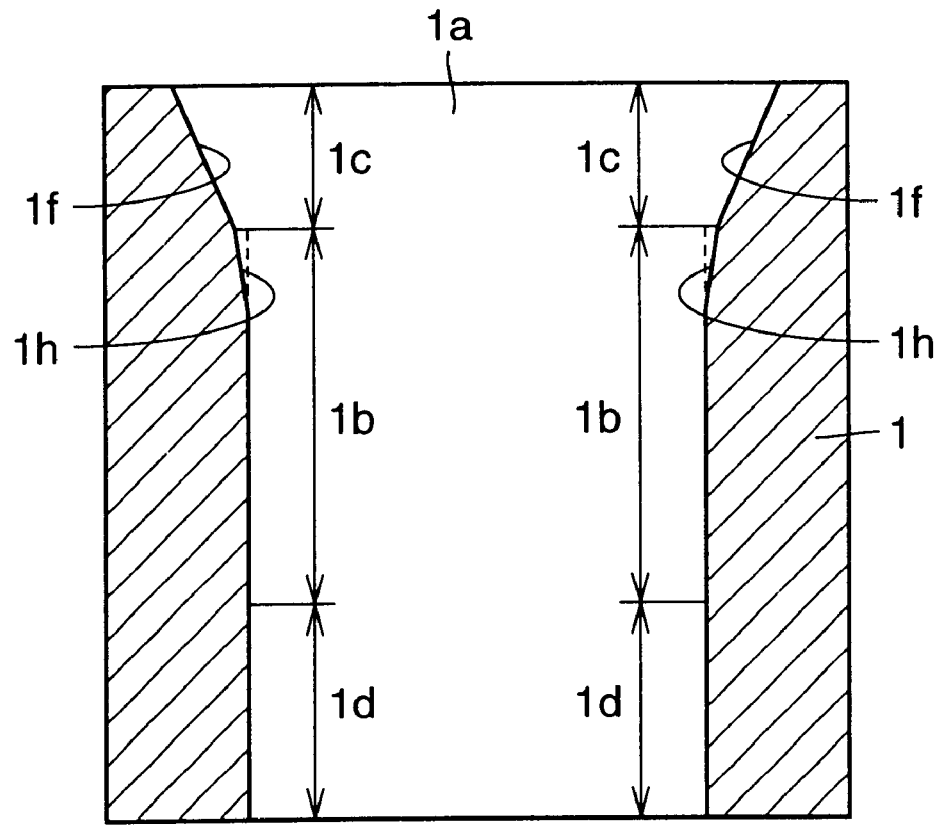
FIG. 17 is a schematic sectional view showing the formation of a tapered portion at a center inner circumferential wall.

Referring to FIG. 16, excessive portion $1b_1$ of center inner circumferential wall $1b$ is compressed by a mold in the sizing process to be blinded. Accordingly, a bearing main unit 1 is fabricated wherein one end side inner circumferential wall $1c$ has a tapered portion $1f$, and center inner circumferential wall $1b$ and other end side inner circumferential wall $1d$ have a straight portion.

Center inner circumferential wall $1b$ may be formed to have a tapered portion $1h$ (close to straight portion) of a tapered angle smaller than that of tapered portion $1f$ at the side of one end side inner circumferential wall $1c$ and a straight portion at other end side inner circumferential wall $1d$.

Tapered portion $1f$ may be provided at either or both of one end side and other end side inner circumferential walls $1c$ and $1d$. Also, one end side and the other end side inner circumferential walls $1c$ and $1d$ may be formed in a shape of a combination of a tapered portion and a straight portion.

In the present third embodiment, a tapered portion of angle θ is provided at upper punch 31 in forming compact 1 shown in FIG. 15. Therefore, damage of upper punch 31 during compacting can be prevented.

Figure 18:
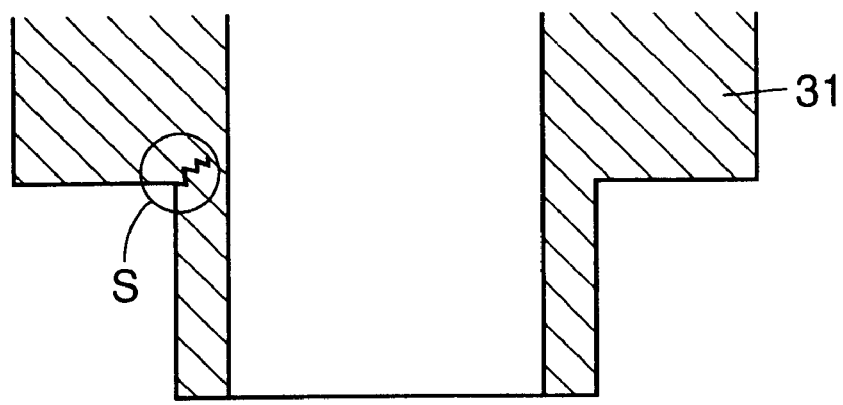
FIG. 18 is a schematic sectional view to describe the disadvantage when a tapered portion is not formed at the upper punch.

For example, if upper punch 31 lacks a tapered portion as shown in FIG. 18, there is a possibility of damage during the compacting step at a region S of upper punch 31. In the case where a tapered portion of angle θ is formed at upper punch 31 as shown in FIG. 15, the damage as shown in FIG. 18 can be prevented since this portion can be made thicker.

The straight portion of center inner circumferential wall $1b$ contributes to the storage and circulation of lubricant at the time of initiating the operation in a low temperature district environment. When a tapered portion $1h$ is formed at the closing pore portion corresponding to center inner circumferential wall $1b$, that tapered portion $1h$ contributes to lubricant storage during general operation. Each of the tapered portion and straight portion formed at one end side inner circumferential wall $1c$ and the other end side inner circumferential wall $1d$ contribute to storage and circulation of the lubricant during general operation.

Figures 19A, 19B:
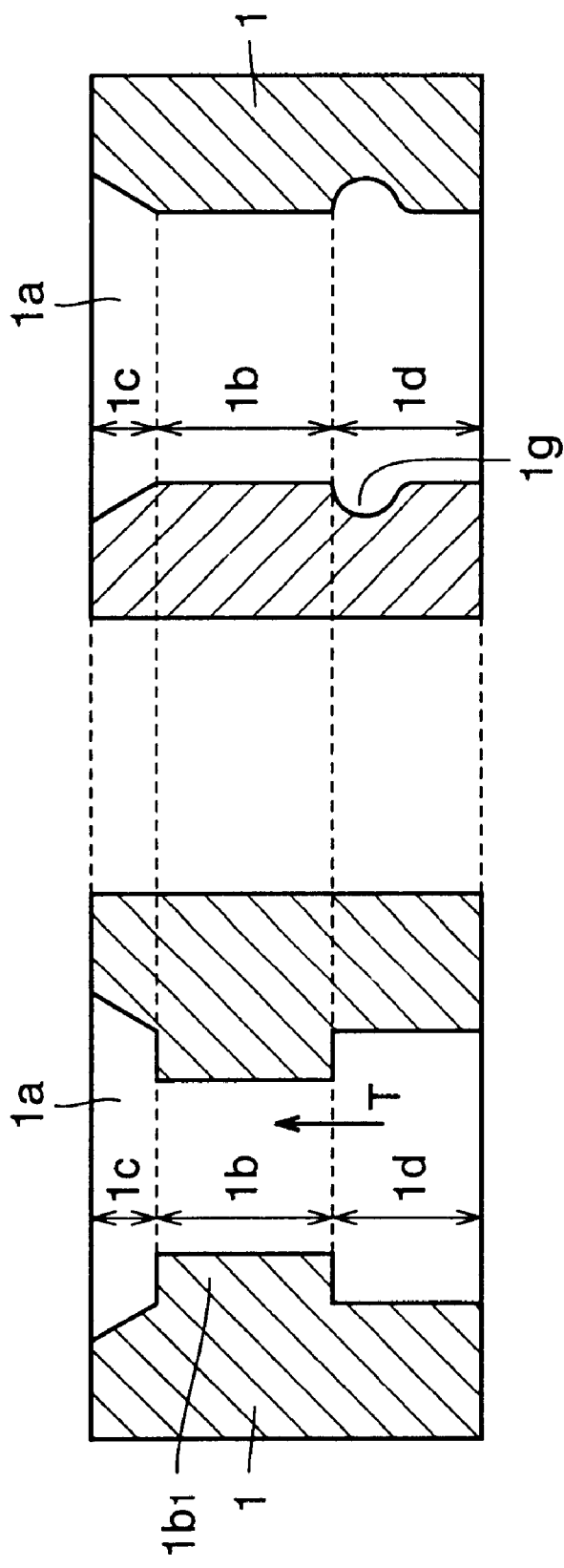
FIGS. 19A and 19B are schematic sectional views before and after the sizing process to describe the disadvantage when there is an abrupt stepped portion between the excessive portion and the other end side inner circumferential wall.

Referring to FIG. 19A, excessive portion $1b_1$ is pulled in the moving direction of the core rod (direction of arrow T) during the sizing process. If there is an abrupt stepped portion between excessive portion $1b_1$ of center inner circumferential wall $1b$ and other end side inner circumferential wall $1d$, a recessed portion $1g$ of approximately 0.01–0.1 mm is generated between center inner circumferential wall $1b$ and other end side inner circumferential wall $1d$ as shown in FIG. 19B by the pulling action during the sizing process. This recessed portion $1g$ will degrade lubricant circulation.

To this end, it is preferable to form a tapered portion having an inclination of γ (for example at least 5° and not more than 20°) and a radius portion having a curvature R (for example, at least 1R) at, for example, the other end side inner circumferential wall $1d$ side of excessive portion $1b_1$ of center inner circumferential wall $1b$ as shown in FIG. 20A. The provision of a tapered portion and radius portion allows the stepped portion between excessive portion $1b_1$ and other end side inner circumferential wall $1d$ to be gentle. Accordingly, no recessed portion $1g$ as shown in FIG. 19B will be generated even if excessive portion $1b_1$ is pulled in the moving direction of the core rod during the sizing process. Thus, the region between center inner circumferential wall $1b$ and the other end side inner circumferential wall $1d$ can be formed straight as shown in FIG. 20A.

According to the sintered oil retaining bearing of the present invention, the problem of lubricant being taken up in the open pores at the closing pore portion can be suppressed even in the case where operation is ceased under an extremely low temperature environment since the air permeability is not more than $0.3 \times 10^{-3}$ darcy. Sufficient lubricant is present at the sliding surface between the rotary shaft and the bearing main unit when the rotary operation starts. Noise caused by local contact between the rotary shaft and the bearing main unit will not be generated.

According to the fabrication method of a sintered oil retaining bearing of the present invention, air permeability of not more than $0.3 \times 10^{-3}$ darcy that could not be obtained by the conventional method can now be obtained by forming a closing pore portion by compression with a mold during the sizing process.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A sintered oil retaining bearing having a bearing bore formed through which a rotary shaft is inserted at a bearing main unit formed of a porous sintered alloy, wherein an inner circumferential wall that serves as said bearing bore includes a closing pore portion having air permeability of not more than $0.3 \times 10^{-3}$ darcy.

2. The sintered oil retaining bearing according to claim 1, wherein the air permeability of said closing pore portion is not more than $0.1 \times 10^{-3}$ darcy.

3. The sintered oil retaining bearing according to claim 1, wherein said inner circumferential wall serving as said bearing bore includes a center inner circumferential wall located at a center region of said inner circumferential wall, and one end side inner circumferential wall and other end side inner circumferential wall located at one end side and the other end side, respectively, of said center inner circumferential wall in a direction of said rotary shaft, wherein said center inner circumferential wall corresponds to said closing pore portion, and has air permeability smaller than the air permeability of said one end side inner circumferential wall and said other end side inner circumferential wall.

4. The sintered oil retaining bearing according to claim 3, wherein said one end side inner circumferential wall includes a first tapered portion having a bore diameter increasing towards said one end side, said other end side inner circumferential wall includes a first straight portion extending in the direction of said rotary shaft while maintaining the bore diameter of said bearing bore, and said center inner circumferential wall includes a second straight portion at said other end side, extending in the direction of said rotary shaft while maintaining the bore diameter of said bearing bore, and a second tapered portion at said one end side, having a bore diameter increasing towards said one end side and an inclination angle smaller than the inclination angle of said first tapered portion.

5. The sintered oil retaining bearing according to claim 1, wherein said bearing main unit is formed of at least one type of material selected from the group consisting of Fe, Fe—Cu system and Cu—Sn system.

6. The sintered oil retaining bearing according to claim 1, wherein said bearing main unit is formed of Fe—Cu system material, and includes Fe reduced powder.

7. The sintered oil retaining bearing according to claim 6, wherein said Fe reduced powder is included at least 45% by mass and not more than 60% by mass of the entire mass.

8. The sintered oil retaining bearing according to claim 1, wherein an effective porosity of said bearing main unit is at least 20% by volume.

9. A fabrication method of fabricating the sintered oil retaining bearing according to claim 1, said fabrication method comprising the steps of:

forming a compact of said bearing main unit so as to include an excessive portion in said bearing bore by powder compacting, sintering said compact to form a sintered compact and applying a sizing process on said sintered compact to compress said excessive portion with a mold to form said closing pore portion of which said air permeability is lower than an air permeability of other portions in said bearing bore.

10. The fabrication method according to claim 9, wherein said inner circumferential wall serving as said bearing bore includes a center inner circumferential wall located at a center portion of said inner circumferential wall, and one end side inner circumferential wall and other end side inner circumferential wall located at one end side and the other end side, respectively, of said center inner circumferential wall in the direction of said rotary shaft, and wherein said excessive portion is formed at said center inner circumferential wall.

11. The fabrication method according to claim 10, wherein said step of forming a compact includes the step of forming the excessive portion so as to include a tapered portion having a bore diameter of said bearing bore increasing towards said one end side inner circumferential wall or said other end side inner circumferential wall from said excessive portion, and a radius portion having a curvature, located between said tapered portion and said one end side inner circumferential wall or said other end side inner circumferential wall.

12. The fabrication method according to claim 9, wherein said excessive portion has a dimension in diameter of at least 4% and not more than 10% of an inner diameter of said bearing bore after said sizing process.

13. The fabrication method according to claim 9, wherein said excessive portion has a dimension of at least 0.35 mm and not more that 0.9 mm in diameter.

* * * * *